United States Patent [19]

Yoshida et al.

[11] Patent Number: 5,767,853

[45] Date of Patent: Jun. 16, 1998

[54] COMPUTER OPERATING METHOD AND COMPUTER OPERATED THEREBY

[75] Inventors: Kenichi Yoshida, Kitamoto; Hiroshi Motoda, Saitama-Ken, both of Japan

[73] Assignee: Hitachi, Ltd., Tokyo, Japan

[21] Appl. No.: 531,618

[22] Filed: Sep. 21, 1995

[30] Foreign Application Priority Data

Sep. 30, 1994 [JP] Japan .................................. 6-236440
Dec. 9, 1994 [JP] Japan .................................. 6-305887

[51] Int. Cl.$^6$ .................................................. G06F 3/00
[52] U.S. Cl. ............................................ 345/349; 395/702
[58] Field of Search ..................... 395/349, 701, 395/967, 966, 965, 676, 702

[56] References Cited

U.S. PATENT DOCUMENTS

| | | | |
|---|---|---|---|
| 4,827,404 | 5/1989 | Barstow et al. | 395/500 |
| 5,099,413 | 3/1992 | Sakai | 395/702 |
| 5,291,587 | 3/1994 | Kodosky et al. | 395/500 |
| 5,386,508 | 1/1995 | Itonori et al. | 395/701 |
| 5,414,847 | 5/1995 | Tsukakushi | 395/702 |
| 5,448,736 | 9/1995 | Yuasa et al. | 395/702 |
| 5,555,367 | 9/1996 | Premerlani et al. | 395/604 |

OTHER PUBLICATIONS

"Concept Learning from Interference Pattern", Japanese Society for Artificial Intelligence, vol. 7, No. 4(1992) pp. 675-685.

"Guest Editors Preface", Artificial Intelligence, CLIP (1995).

*Primary Examiner*—A. Katbab
*Attorney, Agent, or Firm*—Antonelli, Terry, Stout & Kraus, LLP

[57] ABSTRACT

A computer having an estimating capability estimates, where one data file is shared by a plurality of application programs, application programs to be executed when a given data file is designated, thereby simplifying user operations. The computer includes a storage device for storing history of computer operations performed by a user; a display device for displaying indications such as icons; an input device such as a mouse for selectively designating any of the icons displayed on the display device; and a control device for executing an application program when an icon corresponding to that application program is designated by the input device. In operation, the application program to be executed upon designation of a data file is altered by the control device in accordance with history of computer operations stored in the storage device. In that case, the icon shown to correspond with the data file is replaced by another icon corresponding to the altered application program to thereby notify the user that the application program started from the data file is now altered.

52 Claims, 6 Drawing Sheets

IF DATABASE PROGRAM 15 UPDATES DATA 17;
THEN CHART-MAKING PROGRAM 13 CONVERTS DATA
17 AND 18 INTO TABLE 19; WORD PROCESSOR 12
PREPARES DOCUMENT 21 BASED ON TABLE 19 AND
DRAWING 20; AND PRINT-OUT PROGRAM 11 PRINTS
THE RESULTING DOCUMENT.

1. EXECUTE CHART-MAKING PROGRAM 13
2. EXECUTE DRAWING PROGRAM 14
3. EXECUTE WORD PROCESSOR 12

1

COMPUTER OPERATING METHOD AND COMPUTER OPERATED THEREBY

BACKGROUND OF THE INVENTION

The present invention relates to a method for constituting a computer screen. More particularly, the invention relates to a computer operating method for varying the relationship between the application program being executed and what is shown on the screen, such as data files that are fixed conventionally by the system in use. The present invention also relates to a computer operated in accordance with the aforementioned method.

A graphical user interface system is a system which allows a user to designate icons on a display screen to select desired application programs. With such a system, the relationship between each of the displayed icons and the executed program is conventionally fixed. That is, only one application program can be easily designated for execution in conjunction with one data file.

Traditionally, there are cases where a computer language, such as a batch program or a macro, is used to combine a plurality of application programs, such as a word processor, a drawing program, a database, and a spread sheet program in order to perform complicated tasks. There also exist application programs, each allowing macros to be defined therein, with each macro being used to carry out a plurality of operations.

In the cases discussed above, where a single data file is shared by a plurality of application programs, it is required conventionally to designate these application programs apart from the data file. This complicates the operations for the user to carry out.

In addition, creating macros requires the user to possess a specialized knowledge about computer language. General computer users, therefore, often find it difficult to create macros to suit their individual purposes.

SUMMARY OF THE INVENTION

It is an object of the present invention to overcome the above-described drawbacks and disadvantages providing a computer having an estimating capability used, where one data file is shared by a plurality of application programs, for estimating the application programs to be executed when a given data file is designated, whereby the user's operations are simplified.

It is another object of the present invention to provide a method for easily creating macros, thereby simplifying a user's computer operations.

In carrying out the invention and according to one aspect thereof, there is provided a computer operating method for use with a computer comprising: a storage device for storing history of computer operations by a user; a display device for displaying indications such as icons; an input device such as a mouse for selectively designating any of the icons displayed on the display device; and a control device for executing an application program when an icon corresponding to that application program is designated by the input device. In this aspect of the invention, an application program to be executed upon designation of a data file is altered by the control device in accordance with an history of computer operations stored in the storage device. In that case, the icon shown to correspond with the data file is replaced with another icon corresponding to the altered application program. This notifies the user that the application program, started from the data file, is now altered.

2

According to another aspect of the invention, there is provided a computer operating method for use with a computer, comprising a display device for displaying both a stored history of computer operations and dependencies of data to be either used or created, and an input device by which an user designates the creation of a macro in accordance with the display by the display device.

DESCRIPTION OF THE PREFERRED EMBODIMENTS

Preferred embodiments of the invention will now be described with reference to the accompanying drawings.

Figure 1:
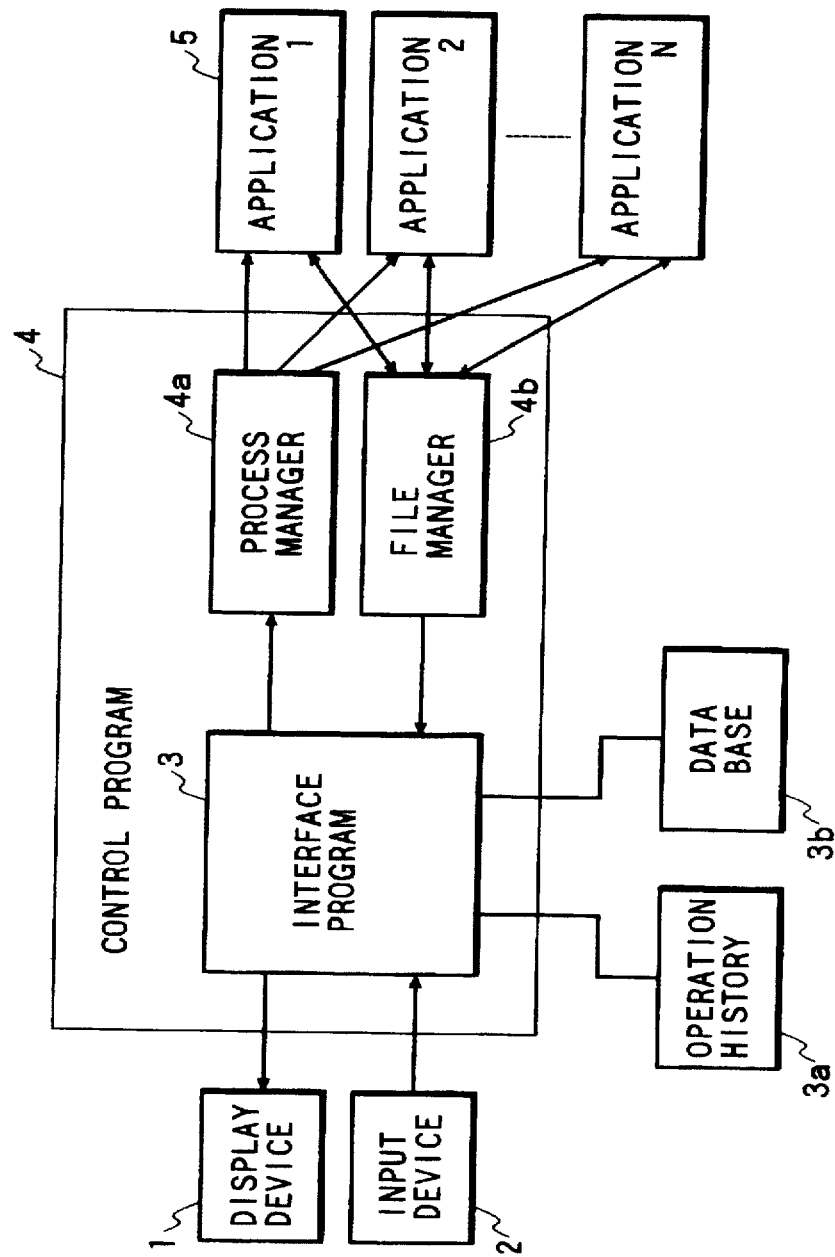
FIG. 1 is a block diagram showing the basic constitution of a computer system in accordance the present invention.

FIG. 1 is a block diagram showing the basic constitution of a computer system embodying the invention. In FIG. 1, a display device 1 is provided for displaying indications on a screen. The display device 1 may be a standard display device for use with computers. An input device 2 is provided for selectively designating the indications displayed on the display device. The input device 2 may be a standard input device such as a mouse and/or a keyboard for use with computers. Application programs 5 include a calculating program such as a word processor, a database system, and other programs for use by computer users. A control program 4 includes control means for executing individual application programs. Generally, the control program is control software known as the operating system. A process manager 4a is part of the control program 4, illustratively made up of a control program subroutine for executing and switching application programs. A file manager 4b is also part of the control program 4; it may be a control program subroutine for supporting the operation of data files needed by application programs. An interface program 3 is also part of the control 4; it may be a subroutine for determining the application program to be executed by the process manager 4a in accordance with the history of computer user operations stored as an operation history 3a. The operation history 3a, i.e., a stored history of computer operations by a the user, may be a set of data retained by storage device such as a memory used by programs. A database 3b stores criteria by which the interface program 3 selects application programs.

The database 3b may be a set of data retained by the storage device, such as the memory used by the programs.

Figure 2:
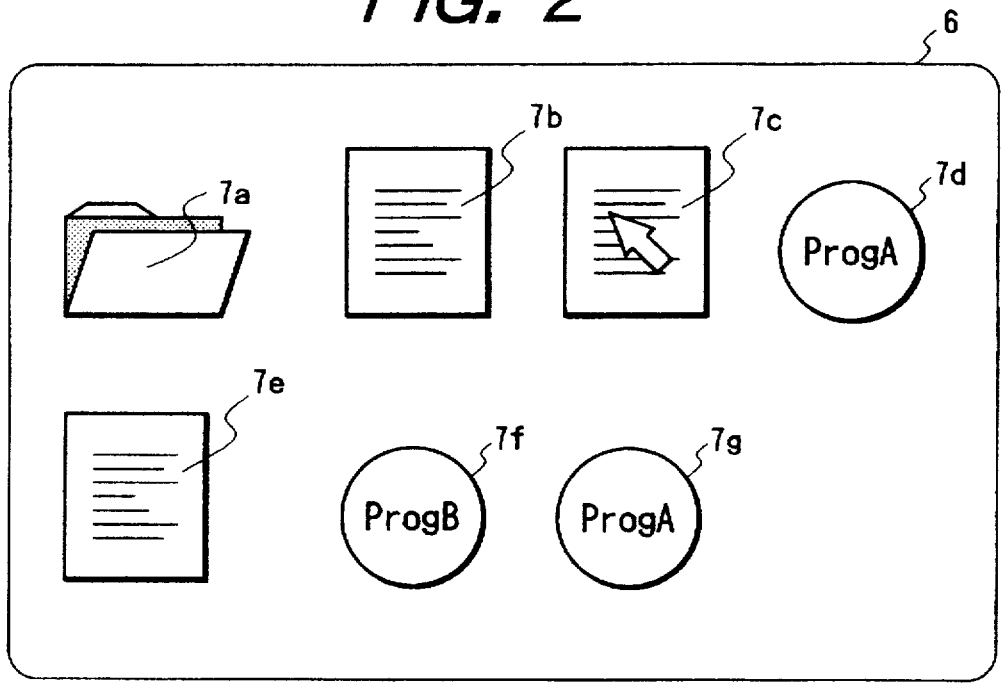
FIG. 2 is a view of a conventional screen display.
Figure 3:
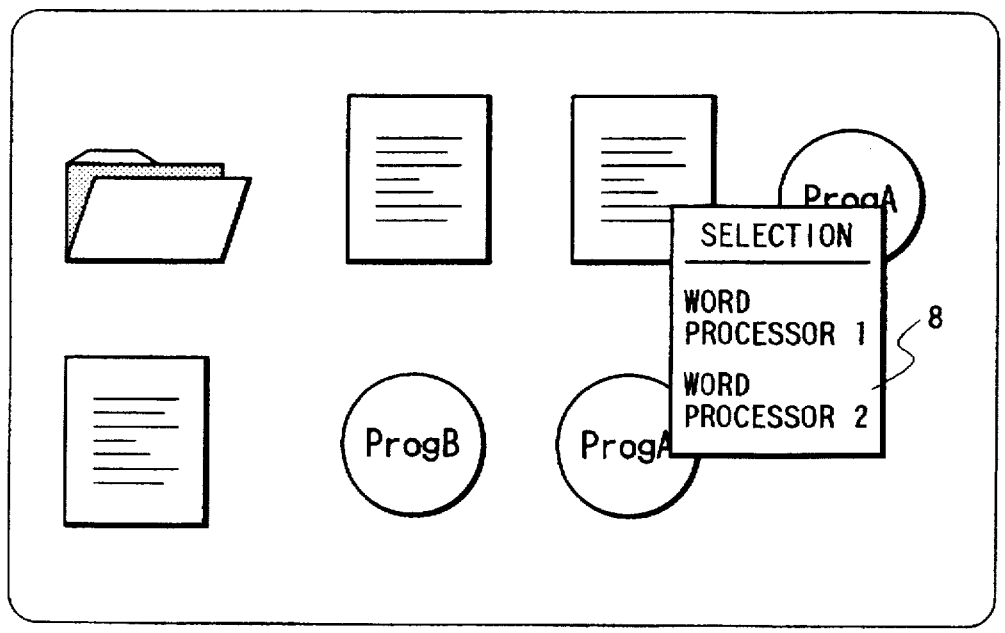
FIG. 3 is a view of another conventional screen display.
Figure 4:
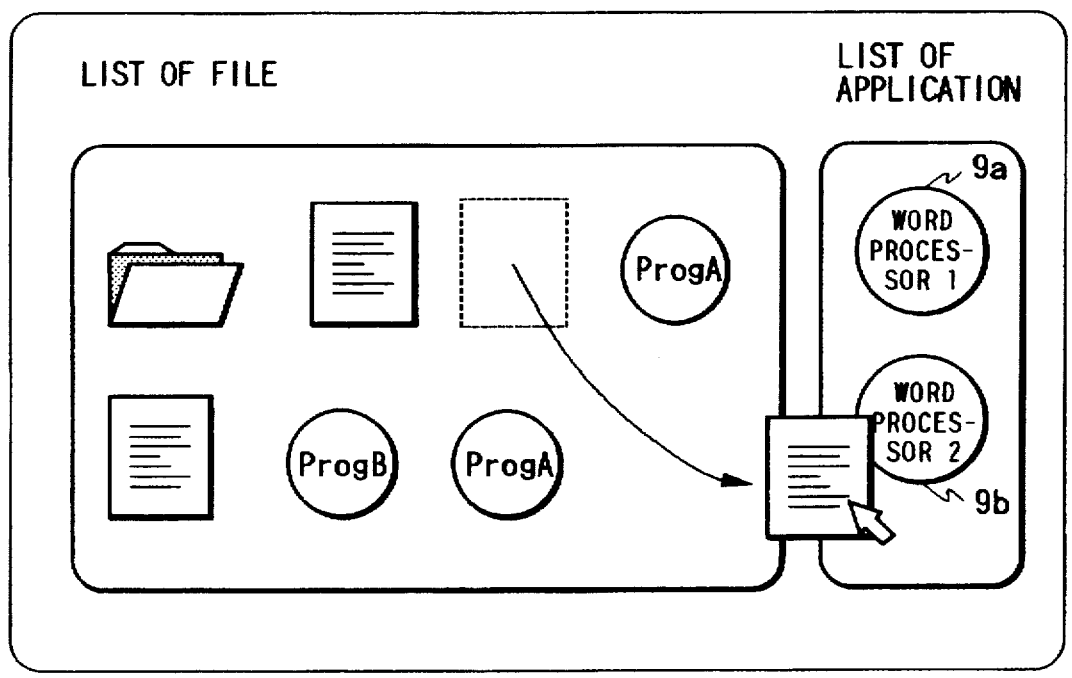
FIG. 4 is a view of a further conventional screen display.

FIGS. 2, 3 and 4 show examples of conventional screen displays on the display device 1. The input device 3 is used to designate any of icons 7a through 7g on a screen 6. In the example of FIG. 2, designating the icon 7c starts a word processor program. In this example, however, sufficient consideration is not provided for a plurality of word processors to be used selectively. That is, only one word processor can be started from one data file. In the example of FIG. 3, designating a word processor program causes a word processor selection menu 8 to appear on the screen. In this menu, the user selects the desired word processor. The operations thus become more complicated for the user to carry out. In the example of FIG. 4, a plurality of application programs are displayed separately (9a and 9b) from the beginning. In that case, the so-called "drag and drop" operation is executed to designate the combination of a data file and an application program. This, too, complicates what needs to be performed by the user.

First Embodiment

Figure 5:
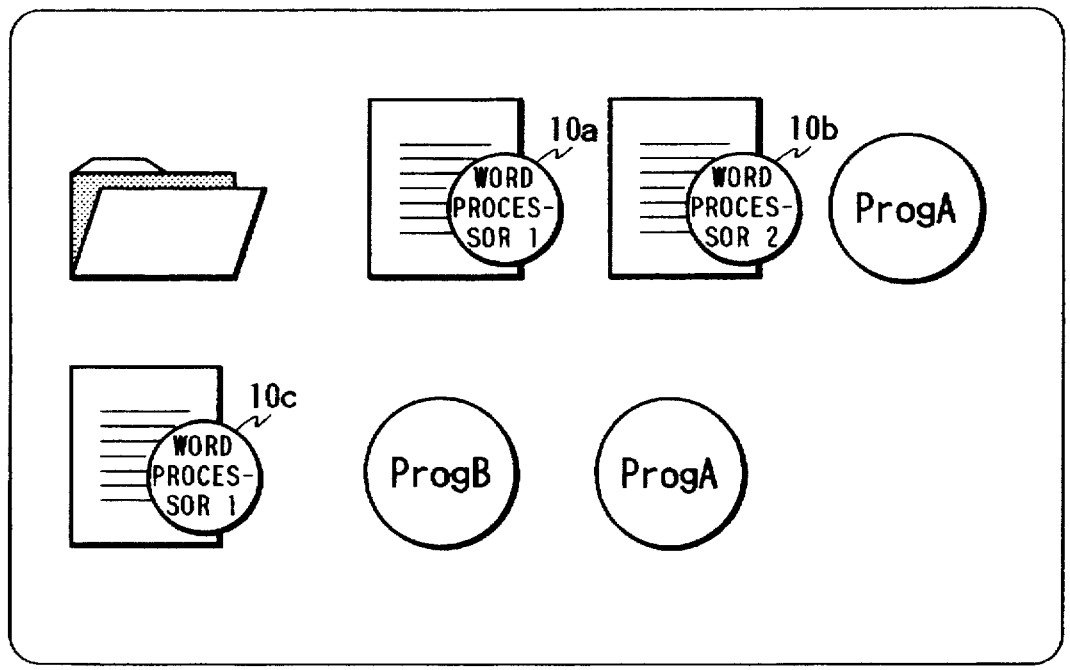
FIG. 5 is a view of a screen display according to the present invention.

FIG. 5 shows a screen display according to the invention. In this screen display, the following takes place: when a single data file is to be shared by a plurality of application programs, designating a given data file highlights icons 10a, 10b and 10c where appropriate on the screen. The highlighted icons stand for the application programs that are estimated to be used in conjunction with the designated data file in accordance with the history of computer user operations stored in the operation history 3a. In this manner, simply designating one data file causes the desired application programs to be started as per the operation history.

With the first embodiment, it is the interface program 3 that estimates the application programs to be started.

Table 1 below is an example of the operation history 3a retaining the number of times each application program 5 was started in combination with a given data file as specified by the computer user.

TABLE 1

| File Name | Application Name | Execution Count |
|-----------|------------------|-----------------|
| File 1    | Word processor 1 | 10              |
| File 1    | Word processor 2 | 1               |
| File 2    | Word processor 1 | 2               |
| ...       |                  |                 |
| ...       |                  |                 |

In the beginning, no data is retained in the operation history 3a. This means that when the user designates an icon on the display device 1, the interface program 3 is incapable of uniquely determining the application program 5 to be started. Therefore, the user initially selects the desired application program 5 in the conventional manner illustrated in FIG. 3 or 4. Thereafter, the interface program 3 requests the process manager 4a, i.e., a subroutine of the control program 4, to start the selected application program 5. At the same time, the interface program 3 stores the combination of the data file with the application program 5 in the operation history 3a along with an execution count of 1.

The display device 1 then displays the icon representing the application program 5 whose execution count is the highest in combination with each data file as stored in the operation history 3a. If the icon displayed on the display device 1 represents the desired application program, the user designates execution of that program. The designating operation is accomplished simply by the user illustratively double-clicking a mouse employed as the input device 2. If the display icon does not represent the desired application program, the user may typically keep pressing the mouse button to call a conventional menu in which the desired application program is selected.

Every time an application program 5 inputs a data file, the execution count is incremented by 1 for the combination of that application program with the data file in the operation history 3a. The execution count increment is performed by the file manager 4b updating the operation history 3a when the application program 5 requests the control program 4 to manipulate the data file for input, the file manager 4b being used by the control program 4 for file manipulation.

With the first embodiment, the application program having the highest execution count attributed thereto is displayed on the display device. Statistically, the scheme usually provides an easy way to start the application programs. In this case, the database 3b is not used.

Second Embodiment

In another embodiment of the invention, the operation history 3a may record the application program 5 that used the data file in question most recently. When the user designates a data file, the application program which last used that data file may be selected for execution. In this case, there is no need to retain the execution count and thus the invention is implemented more simply by the second embodiment than by the first embodiment.

Third Embodiment

Figures 6, 7:
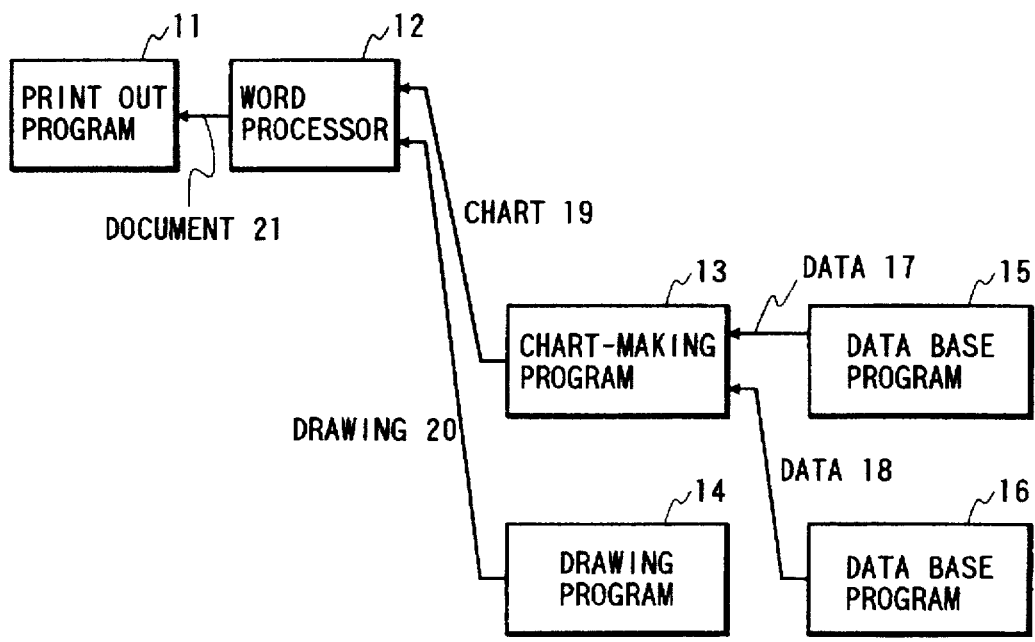
FIG. 6 is a schematic view of a typical pattern of computer operations by a user.
FIG. 7 is a view of a knowledge base for use by an interface program 3 (to be described later) employed by the present invention.

In a further embodiment of the invention, so-called expert system techniques may be utilized. A separate knowledge base is furnished as the database 3b composed of rules. These rules in the database 3b may be used to estimate the application programs 5 to be started. For example, suppose that a typical pattern of computer user operations, such as one shown in FIG. 6, is known in advance. In that case, the knowledge base of FIG. 7 is provided so that the application programs to be started next will be estimated thereby.

The example of FIG. 6 shows a typical flow of computer operations frequently executed by the user. Specifically, database programs 15 and 16 are first used to update data 17 and 18. The data 17 and 18 are compiled into a table 19 by a chart-making program 13. The table 19, along with a drawing prepared by a drawing program 14, is included into a document 21 by a word processor 12. The result is printed by a print-out program 11. This kind of computer usage pattern by the user is turned into rules representing the recorded user input operations. Such rules may be prepared for use in estimating the application programs, as shown in FIG. 7.

The typical rules in FIG. 7 specify that after the database program 15 has updated the data 17, the chart-making program 13 is to be started next, followed by the word processor 12 and print-out program 11 in that order.

The third embodiment is somewhat complicated to implement since it requires a knowledge of expert systems. Nevertheless, the third embodiment is easier to use because it allows a plurality of application programs to be estimated automatically for use.

Fourth Embodiment

An even further embodiment of the invention involves analyzing the computer user operations stored in the operation history 3a by a method described illustratively in "Concept Learning from Interference Pattern" (proceedings of the Japanese Society for Artificial Intelligence, Vol.7, No.4 (July 1992 pp.675–685). In this publication there is cited an algorithm for extracting a recurring pattern from colored directed graphs. The input of the algorithm corresponds precisely to what is stored in the operation history 3a. This constitutes data in the same format as that of the working pattern shown in FIG. 6. Using the above method, it is possible to generate automatically the rules to be stored in the knowledge base.

Specifically, when an application program outputs a data file, that data file is assigned a unique number as a colored graph node representing specifically the application program. When the same or another application program inputs the data file in question, a graph node having a unique number relative to the application program is prepared, and the node is linked to the previously prepared node. In that case, the link is directed from the output side to the input side. When outputting or inputting a data file, an application program requests the file manager 4b to take over the processing. At that point, the file manager 4b notifies the interface program 3 which application program has input or output which data file. The operation history 3a of this kind is recorded easily.

The operation history 3a input to the above algorithm includes not only the working pattern routinely performed by the user but also patterns of operations carried out incidentally. Of these patterns, the statistically recurring pattern is extracted by the algorithm.

Once the appropriate pattern is extracted, it is converted automatically to the rules such as those in FIG. 7. The conversion is readily accomplished using a suitable program. The rules, thus prepared through conversion, are retained in the database 3b for specific use by the fourth embodiment. This scheme has an additional benefit of not having to prepare any working pattern in advance.

Fifth Embodiment

The fifth embodiment of the invention is an embodiment which creates macros through the use of the operation history. This necessarily means that the control program 4 in FIG. 1 includes a macro-creating program.

With the fifth embodiment, as with the fourth embodiment discussed in reference to FIG. 6, the computer user prepares data by using the database programs 15 and 16. The user then turns the data into the table 19 through the use of the chart-making program 13. With a drawing 20 prepared by the drawing program 14, the user utilizes the word processor 12 to include both the data and the drawing into a document which is then printed by the print-out program 11. The database programs 15 and 16, chart-making program 13, drawing program 14, word processor 12, and print-out program 11 are all part of the application programs 5.

Figures 8, 9:
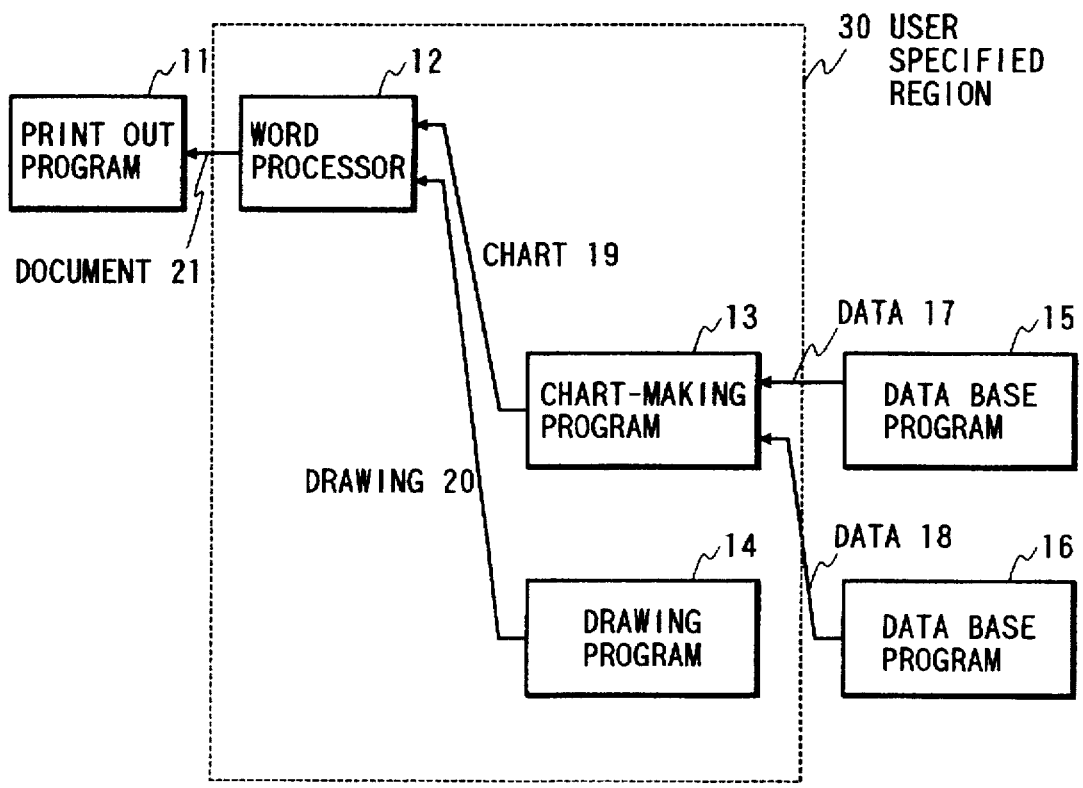
FIG. 8 is a view of typical data dependencies in effect when the invention is applied to the setting of a macro, the view also showing the region of operations to be turned into the macro.
FIG. 9 is a view of a typical macro created automatically in accordance with the procedure of FIG. 8.

When storing a series of steps as a macro into a macro storage, the computer user orders, through the input device 2, the macro-creating program in the control program 4 to create the macro. The macro-creating program displays on the display device 1 the dependencies between the data stored in the operation history 3a. FIG. 8 is a view of typical data dependencies in effect when the user utilizes the application programs 5 in the above-described manner. In FIG. 8, program functions are represented by blocks and results acquired by these functions are indicated in characters. From the display of FIG. 8, the following sequence of operations can be understood: the database programs 15 and 16 first prepare the data 17 and 18; the chart-making program 13 then prepares the table 19 based on the data 17 and 18; the drawing program 14 next draws up the drawing 20; and the word processor 12 prepares the document 21 using the table 19 and drawing 20, the prepared document 21 being delivered to the print-out program 11 for print-out.

The data 17 and 18, the table 19, and the drawing 20 are the data which were stored in the database 3b and which are used or created by the application programs. The history of the data having been used and/or created is retained in the operation history 3a.

Viewing the display, the computer user operates the input device 2 to designate a region of operations to be turned into a macro. The region 30 in FIG. 8 is specified by the user by means of the appropriate input device such as a mouse, the region consisting of the operations covering illustratively the word processor 12, chart-making program 13 and drawing program 14.

FIG. 9 is a view of a typical macro created automatically as per the procedure described above. The macro of this example involves starting the chart-making program 13, drawing program 14, and word processor 15 in that order. The macro is stored in the database 3b. The I/O relations of the data may be easily designated as argument information upon program execution by use of functions in the computer by which the macro is created. The designation of argument information will not be discussed further with reference to FIG. 9, because the information is easy to designate but the designating procedure differs from computer to computer.

With the macro of FIG. 9 in storage, executing that single macro easily carries out another round of a chart-making task by the chart-making program, of a drawing task by the drawing program, and of the task of putting together the prepared table and drawing within a document through word processing. Conventionally, the user is required to have a specialized knowledge of computer language when it comes to creating macros such as one in FIG. 9. The requirement has kept general computer users from readily creating and utilizing macros. In contrast, the fifth embodiment allows users with no specialized knowledge of computers to create macros with ease.

Sixth Embodiment

A further embodiment of the invention is a combination of the fifth embodiment with any one of the first through fourth embodiment. With the sixth embodiment, the function of the fifth embodiment is first used to create a macro. That macro is then added to the selection menu as another application program candidate for explicit designation by the user. As a result, not only the application programs prepared beforehand but also the macro created by the function of the fifth embodiment may be selected automatically in the subsequent operations. This further facilitates the computer operations by the user.

Seventh Embodiment

Figure 10:
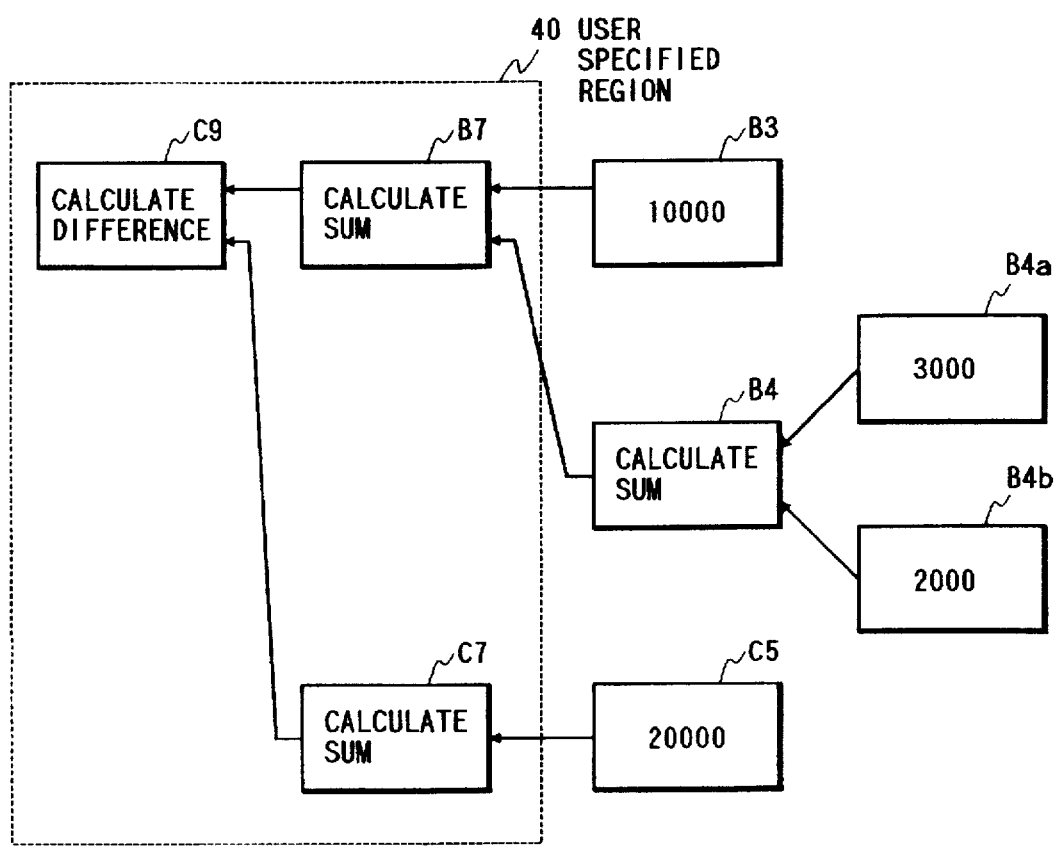
FIG. 10 is a view of typical data dependencies inside a spread sheet program dealing with the example of Table 2 (to be described later), the view also showing the region of operations to be turned into a macro.

The seventh embodiment is used where a spread sheet program is employed. Whereas the example of FIG. 8 involves the use of a plurality of application programs 5 such as a word processor and a chart-making program, there is only one application program, i.e. a spread sheet program, in the example of FIG. 10. The operation history 3a stores the dependencies between the results of calculations by the spread sheet program. For example, suppose that the seventh embodiment is applied to typical transactions listed in Table 2 below. In that case, as shown in FIG. 10, expenditures B4a and B4b are first added up to give a sum B4. The sum B4 is then added to an expenditure B3 to give a sum B7, which is the total sum. Likewise, the revenue ranging from C3 to C5 is indicated as the total income C7. The difference between C7 and B7 is shown as the balance in C9.

TABLE 2

|   | A | B | C |
|---|---|---|---|
| 1 | Date | Expenditure | Revenue |
| 2 | | | |
| 3 | Aug. 1 | 10,000 | |
| 4 | Aug. 2 | 5,000 | |
| 5 | Aug. 4 | | 20,000 |
| 6 | | | |
| 7 | Subtotal | 15,000 | 20,000 |
| 8 | | | |
| 9 | Balance | | 5,000 |
| 10 | | | |

FIG. 10 is a view of typical data dependencies inside the spread sheet program dealing with the transaction example of Table 2, the view also showing the region of operations to be turned into a macro. In the middle of FIG. 10, the sum B4 is calculated from a value "3,000" in B4a and another value "2,000" in B4b, and corresponds to the sum "5,000" in the field B4 of Table 2. The calculation of difference in C9; the calculation of sum in B4, and the calculations of total sums in B7 and C7 in FIG. 10 are available as part of the standard calculation function menu provided by ordinary spread sheet programs. In the example of FIG. 10, the macro-creating program in the control program 4 is ordered to turn the specified region of operations 40 into a macro for calculating the difference between revenues and expenditures. Generally, macros as relatively complicated as that of calculations for finding the difference between revenues and expenditures are not included in the standard set of macros provided by spread sheet programs. Conventionally, such macros are created manually by those who have a specialized knowledge of computers. With the seventh embodiment, in contrast, the user need only specify the region of operations desired to be turned into a macro, and that macro will be created automatically.

Although the seventh embodiment uses a special storage in which to retain the operation history 3a, spread sheet programs generally store interdata relations as part of the stored data. In that respect, the database 3b may double as a storage for the operation history 3a for the example of FIG. 10.

The example of Table 2 deals with data dependencies inside the spread sheet program. Alternatively, if the calculation of sum in B4 in FIG. 10 is effected by another application program such as a database program, the region of operations to be turned into a macro comprises displayed dependencies between a plurality of application programs as well as displayed data dependencies within individual application programs. The scheme, if implemented, constitutes another variation of the invention.

As described, the invention eliminates the conventional need for designating a plurality of applications if they are to share a single data file that is designated separately. Streamlining those complicated designating operations, the invention provides computer users with an easy-to-use interface facility.

As many apparently different embodiments of this invention may be made without departing from the spirit and scope thereof, it is to be understood that the invention is not limited to the specific embodiments thereof except as defined in the appended claims.

What is claimed is:

1. A computer operating method comprising the steps of:

storing history information in a storage unit, said history information including information indicative of dependencies of application programs stored in a memory of said computer, said dependencies being formulated based on previous computer operations performed by a user;

displaying symbolically a combination of said application programs based on said dependencies in said history information;

inputting, through an input device, data representing a region of application programs symbolically displayed; and creating a macro as a new application program corresponding to the region of application programs.

2. A computer operating method according to claim 1, wherein said application programs include a word processor program, a chart-making program, a database program, and a spread sheet program, wherein said dependencies are those of data exchanged typically in a form of files between application programs, and wherein said macro produces a programming result based on execution of said application programs in said region.

3. A computer comprising:

a storage device for storing history information including information indicative of dependencies of application programs stored in a memory of said computer, said dependencies being formulated based on previous computer operations performed by a user;

a display device for symbolically displaying a combination of said application programs based on said dependencies;

an input device for inputting data representing a region of application programs symbolically displayed on said display device; and a macro-creating program for creating a macro as a new application program corresponding to the region of application programs.

4. A method for creating software adapted for execution by a computer having a memory for storing programs and an input device for performing computer operations, said method comprising:

storing, in a storage unit, history information defining relationships among a plurality of application programs stored in said memory;

displaying a logical sequence of icons on a display screen of said computer, said icons representing, respectively, application programs in at least a subset of said plurality of application programs, said logical sequence of icons being formed based on relationships among the application programs in said subset as defined by said history information;

selecting, with said input device, a group of icons from the logical sequence of icons displayed on said display screen, said group of icons defining a relationship among the application programs represented by the icons in said group of icons sufficient to perform a predetermined computer operation; and automatically creating, based on the relationships among the application programs defined by said group of icons, a computer program for performing said predetermined computer operation.

5. A method according to claim 4, further comprising:

storing the computer program in said memory;

displaying a new icon on said display screen representing the computer program; and executing the computer program, upon selection of said new icon by said input device, to perform said predetermined computer operation.

6. A method according to claim 4, further comprising:
preparing data for input into the computer, said data being processed by the application programs represented by the icons in said group of icons to perform said predetermined computer operation.

7. A method according to claim 6, wherein said data is prepared by at least one data base program.

8. A method according to claim 6, wherein said data is prepared by a plurality of data base programs.

9. A method according to claim 6, wherein the data prepared in said preparing step is stored in said storage unit as history information.

10. A method according to claim 6, wherein data processed by application programs represented by icons disposed at intermediate levels within said group of icons are stored in said storage unit as history information.

11. A method according to claim 4, wherein said history information is automatically generated from computer operations manually performed by a user prior to creation of said computer program, said prior computer operations including ones where the user selected the application programs represented by the icons in said group of icons individually in a predetermined order to perform said predetermined computer operation.

12. A method according to claim 11, wherein said history information defining relationships among said plurality of application programs is stored relative to data files stored in said computer.

13. A method according to claim 4, wherein the relationships defined by said history information include information defining data paths connecting inputs and outputs of said plurality of application programs.

14. A method according to claim 4, wherein said computer program is a macro.

15. A method according to claim 4, wherein the step of automatically creating said computer program includes a step of executing program-creating software stored in said memory, said program-creating software generating code sufficient to control an operating system of the computer in such a manner, relative to the application programs represented by the icons in said group of icons, as to perform said predetermined computer operation.

16. A method according to claim 15, wherein said code includes instructions for defining input/output relationships of, and for executing, the application programs represented by the icons in said group of icons.

17. A method according to claim 4, wherein said input device is a mouse.

18. A method according to claim 4, further comprising:
selecting a data file using said input device;
automatically identifying, based on said history information and in response to the data file selection by said input device, at least a subset of said plurality of application programs for processing said data file; and
automatically activating icons on said display screen which correspond to the application programs in said subset.

19. A method according to claim 18, wherein said history information includes a table recording correspondences between said data file and numbers of times the data file has previously been processed by the application programs in said subset.

20. A method according to claim 19, wherein, when a user selects one of the activated icons to thereby identify a corresponding application program for processing the data file, the table included in the history information is automatically updated to indicate that this corresponding application program processed the data file an additional time.

21. A method according to claim 19, wherein, when a new data file is input into the computer, the table included in said history information is automatically updated to include an entry for the new data file, and further is automatically updated to reflect each time one of said plurality of application programs processes the new data file.

22. A method according to claim 18, wherein said memory includes an interface program which identifies the application programs in said subset.

23. A method according to claim 18, further comprising:
automatically starting the application programs in said subset.

24. A method according to claim 4, further comprising:
selecting a data file using said input device;
automatically identifying, based on said history information and in response to the data file selection by said input device, at least a subset of said plurality of application programs for processing said data file; and
automatically activating at least one icon on said display screen which corresponds to at least one of the application programs in said subset.

25. A method according to claim 24, wherein said history information includes a table recording correspondences between said data file and numbers of times the data file has previously been processed by the application programs in said subset.

26. A method according to claim 25, wherein said at least one icon corresponds to an application program in said table which has processed said data file a highest number of times.

27. A method according to claim 24, further comprising:
automatically starting an application program in said subset which corresponds to said at least one icon.

28. A method according to claim 24, wherein, when a user selects said at least one icon to thereby identify a corresponding application program for processing the data file, the table included in the history information is automatically updated to indicate that this corresponding application program processed the data file an additional time.

29. A method according to claim 24, wherein, when a new data file is input into the computer, the table included in said history information is automatically updated to include an entry for the new data file, and further is automatically updated to reflect each time one of said plurality of application programs processes the new data file.

30. A method according to claim 24, wherein said at least one icon corresponds to an application program which last processed said data file.

31. A method according to claim 4, further comprising:
creating a knowledge base containing rules for identifying application programs to be started upon selection of a data file using said input device.

32. A method according to claim 31, wherein the rules in said knowledge base are formulated based on previous patterns of computer operations performed by said user relative to said data file.

33. A method according to claim 32, wherein said previous patterns of computer operations define relationships among application programs included within said plurality of application programs sufficient to process said data file in a manner sufficient to produce a predetermined processing result.

34. A method according to claim 4, further comprising:
executing a spread sheet program which generates on said display screen a spread sheet containing a plurality of block locations;
storing, in said storage unit, history information defining dependencies among at least a subset of the plurality of block locations of said spread sheet;

selecting, with said input device, a group of block locations in said spread sheet, said group of block locations containing information specifying a plurality of spread sheet instructions for performing at least one spread sheet operation; and automatically creating, in response to the selection of said group of block locations, a macro for executing said plurality of spread sheet instructions to perform said at least one spread sheet operation.

35. A computer comprising:

a memory for storing application programs;

a storage unit for storing history information defining relationships among a plurality of application programs stored in said memory;

a display for displaying a logical sequence of icons on a display screen of said display, said icons corresponding to respective application programs in at least a subset of said plurality of application programs, said logical sequence of icons being formed based on relationships among the application programs in said subset as defined by said history information;

an input device for selecting a group of icons from the logical sequence of icons displayed on said display screen, said group of icons defining a relationship among the application programs corresponding to the icons in said group of icons sufficient to perform a predetermined computer operation; and program-creating software stored in said memory for automatically creating, based on the relationships among the application programs defined by said group of icons, a computer program for performing said predetermined computer operation.

36. A computer according to claim 35, wherein said computer includes an operating system for storing said computer program in said memory and for generating a new icon for display on said display screen which corresponds to said computer program, said computer program being executed upon selection of the new icon by said input device.

37. A computer according to claim 35, further comprising:

software for automatically generating said history information generated from computer operations manually performed by a user prior to creation of said computer program, said prior computer operations including ones where the user selected the application programs represented by the icons in said group of icons individually in a predetermined order to perform said predetermined computer operation.

38. A computer according to claim 35, wherein said history information defining relationships among said plurality of application programs is stored relative to data files.

39. A computer according to claim 35, further comprising:

a control program for automatically identifying, based on said history information and in response to a data file selected by said input device, at least a subset of said plurality of application programs for processing said data file, said display automatically activating icons on said display screen corresponding to the application programs in said subset.

40. A computer according to claim 39, wherein said history information includes a table recording correspondences between said data file and numbers of times the data file has previously been processed by the application programs in said subset.

41. A computer according to claim 40, wherein, when a user selects one of the activated icons to thereby identify a corresponding application program for processing the data file, the table included in the history information is automatically updated to indicate that this corresponding application program processed the data file an additional time.

42. A computer according to claim 40, wherein, when a new data file is input into the computer, the table included in said history information is automatically updated to include an entry for the new data file, and further is automatically updated to reflect each time one of said plurality of application programs processes the new data file.

43. A computer according to claim 35, further comprising:

a control program for automatically identifying, based on said history information and in response to a data file selected by said input device, at least a subset of said plurality of application programs for processing said data file, said display automatically activating at least one icon on said display screen which corresponds to at least one of the application programs in said subset.

44. A computer according to claim 43, wherein said history information includes a table recording correspondences between said data file and numbers of times the data file has previously been processed by the application programs in said subset.

45. A computer according to claim 44, wherein said at least one icon corresponds to an application program in said table which has processed said data file a highest number of times.

46. A computer according to claim 44, wherein, when a user selects said at least one icon to thereby identify a corresponding application program for processing the data file, the table included in the history information is automatically updated to indicate that this corresponding application program processed the data file an additional time.

47. A computer according to claim 44, wherein, when a new data file is input into the computer, the table included in said history information is automatically updated to include an entry for the new data file, and further is automatically updated to reflect each time one of said plurality of application programs processes the new data file.

48. A computer according to claim 43, wherein said at least one icon corresponds to an application program which last processed said data file.

49. A computer according to claim 35, further comprising:

a knowledge base containing rules for identifying application programs to be started upon selection of a data file using said input device.

50. A computer according to claim 49, wherein the rules in said knowledge base are formulated based on previous patterns of computer operations performed by said user relative to said data file.

51. A computer according to claim 50, wherein said previous patterns of computer operations define relationships among application programs included within said plurality of application programs sufficient to process said data file in a manner sufficient to produce a predetermined processing result.

52. A computer according to claim 35, further comprising:

a spread sheet program for generating on said display screen a spread sheet containing a plurality of block locations; and a control program for creating a macro, wherein said storage unit stores history information defining dependencies among at least a subset of the plurality of block locations of said spread sheet, wherein said input device selects a group of block locations in said spread sheet, said group of block locations containing information specifying a plurality of spread sheet instructions for performing at least one spread sheet operation, and wherein said control program automatically creates, in response to the selection of said group of block locations, a macro for executing said plurality of spread sheet instructions to perform said at least one spread sheet operation.

* * * * *